No. 836,104. PATENTED NOV. 20, 1906.
F. H. EVERHART.
VARIABLE SPEED POWER TRANSMITTING MECHANISM.
APPLICATION FILED NOV. 17, 1905.

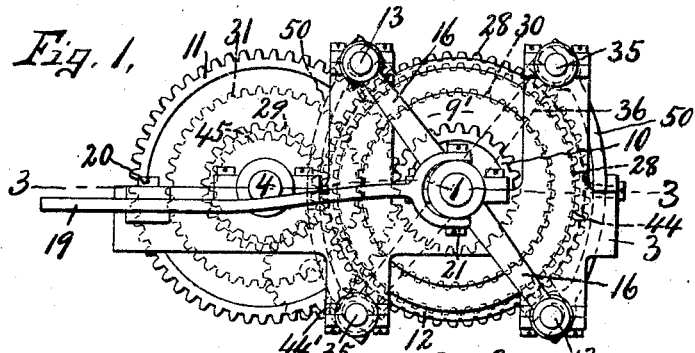

2 SHEETS—SHEET 2.

WITNESSES:
B. E. Robinson
K. E. Chase

INVENTOR:
F. H. Everhart
BY:
Howard P. Denison
ATTORNEY.

UNITED STATES PATENT OFFICE.

FOIST H. EVERHART, OF CLYDE, NEW YORK.

VARIABLE-SPEED POWER-TRANSMITTING MECHANISM.

No. 836,104.      Specification of Letters Patent.      Patented Nov. 20, 1906.

Application filed November 17, 1905. Serial No. 287,882.

*To all whom it may concern:*

Be it known that I, FOIST H. EVERHART, of Clyde, in the county of Wayne, in the State of New York, have invented new and useful Improvements in Variable-Speed Power-Transmitting Mechanism, of which the following, taken in connection with the accompanying drawings, is a full, clear, and exact description.

This invention relates to certain improvements in variable-speed power-transmitting mechanisms involving high, low, and intermediate speeds and a reverse drive-gear and is similar in many respects to the device shown in my pending application, Serial No. 281,657, filed October 6, 1905, of which this is an improvement.

The essential purpose of my present invention is to introduce an intermediate-speed drive-gear and to bring the whole mechanism within a more compact space and to thereby simplify and reduce the cost of construction and at the same time prevent any possibility of throwing two different driving-gears into action at the same time.

One of the specific objects is to mount all of the friction-clutches upon the same axis coincident with that of the driving and driven shafts and to arrange the driven clutch members for the different speeds in pairs, so that a single friction driving element may be reciprocated between the driven members of each pair for imparting rotary motion to either independently of the other.

Another specific object is to provide a separate sliding yoke for manipulating each friction driving element and to provide such yokes with suitable abutments, coacting with levers, whereby when one sliding clutch element is thrown in action, one or both of the sliding elements which may have been inadvertently left in action are simultaneously thrown out of action, thus making it impossible to bring two different driving mechanisms into action at the same time and thereby preventing undue impairment or breakage of the wearing parts.

Other objects and uses will be brought out in the following description.

Figure 3:
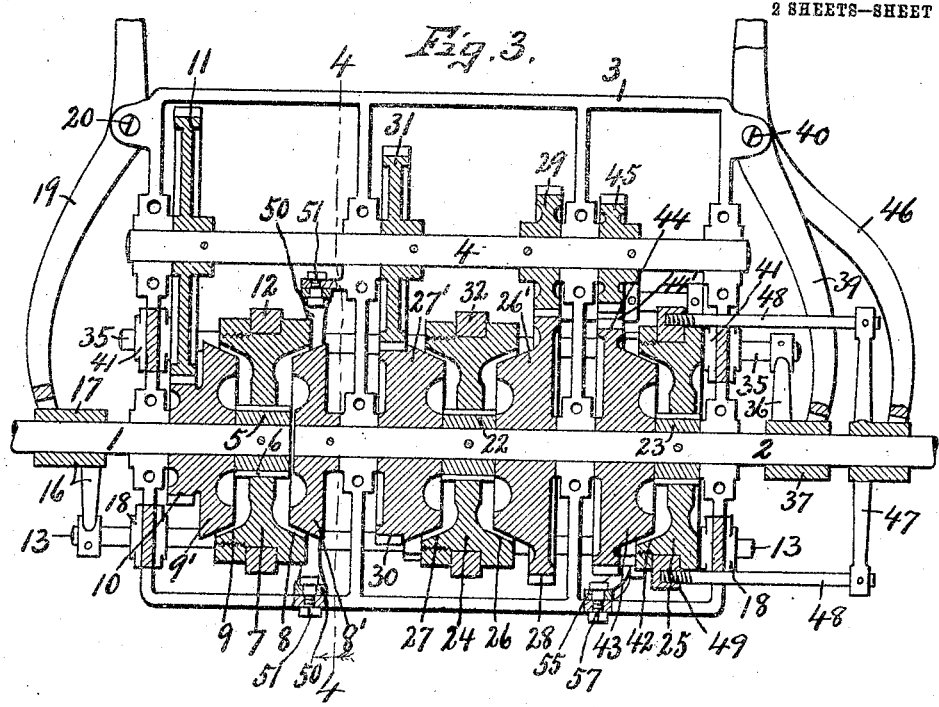
Figure 4:
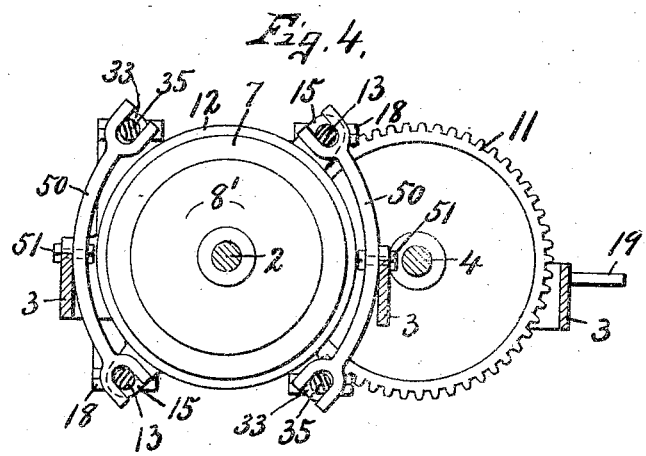

In the drawings, Figures 1 and 2 are respectively an end view and a top plan of the variable-speed power-transmitting device embodying the various features of my invention. Fig. 3 is a horizontal sectional view taken on line 3 3, Fig. 1; and Fig. 4 is a transverse vertical sectional view taken on the line 4 4, Fig. 3.

In carrying out the objects stated a drive-shaft 1 and a driven shaft 2 are mounted end to end upon the same axis in a suitable frame 3, and upon this frame is also mounted an auxiliary shaft 4, parallel with the axis of the shafts 1 and 2.

The driving-shaft 1 may be the ordinary crank-shaft of a gas or other engine for propelling vehicles, as automobiles, and upon the inner end of this driving-shaft 1 is rigidly secured a collar 5, having one or more keyways 6, upon which is feathered to move axially a concentric friction driving element 7, having opposite conical friction-faces 8 and 9. A driven clutch element 9' is loosely mounted upon the driving-shaft when at the outer end of the driving element 7 and is provided with a conical friction-face adapted to be engaged by the friction-face 9 of the driving element and is also provided with a spur-pinion 10, which is in permanent mesh with a comparatively large gear 11, rigid on the shaft 4.

At the opposite end of the driving-clutch member 7 is a driven clutch member 8', which is rigidly secured to the adjacent end of the driven shaft 2 and is provided with a conical friction-face adapted to be engaged by the similar friction-face 8 of the driving-clutch member 7 for high-speed transmission of power directly from the driving-shaft 1 to the driven shaft 2. This driving-clutch element 7 therefore rotates continuously with the driving-shaft 1 and is normally held out of engagement with both of the driven clutch members 8' and 9' and is reciprocated axially into and out of engagement with said driven clutch members by means of a collar 12 and axially-movable rods 13, which are provided with opposite jam nuts or shoulders 14, receiving between them radially-projecting arms 15 on the collar 12, said rods 13 being located equally distant from and at opposite sides of the shafts 1 and 2 and are connected at their outer ends by a transverse bar 16, having a central hub 17 loosely mounted and guided upon the outer end of the driving-shaft 1.

The parallel rods 13 and their connecting cross-bar 16 constitute a sliding yoke by which the driving-clutch element 7 is reciprocated endwise, said rods 13 being guided in suitable bearings 18 on the opposite ends of the frame 3. This yoke may be reciprocated by any suitable means, as a lever 19, which is fulcrumed at 20 and has one end pivotally connected at 21 to the hub 17, so that by shifting the lever and yoke in one direction the driving-clutch element 7 will be forced into engagement with the clutch member 8', for directly driving the shaft 2 under high speed. By moving said lever and yoke in the opposite direction to engage clutch member 7 with clutch member 9' motion will be transmitted, through the medium of a pinion 10 and gear 11, to the auxiliary shaft 4, from which the shaft 2 is driven at different speeds or in a reverse direction, as will be hereinafter described.

Rigidly secured to the driven shaft 2 are additional collars 22 and 23 having lengthwise keyways similar to the collar 5, and upon these collars are feathered, respectively, two driving-clutch elements 24 and 25. The clutch element 24 is therefore movable axially and is provided with opposite conical friction-faces 26 and 27 for engagement, respectively, with a conical clutch member 26' and a similar clutch member 27', said clutch members 26' and 27' being loosely mounted upon the driven shaft 2 at opposite ends of the driving-clutch element 24.

The clutch member 26' is provided with a comparatively large spur-gear 28, which is in permanent mesh with a pinion 29, rigid on the shaft 24, and the opposite clutch member 27' is provided with a somewhat similar spur-gear 30, which is in permanent mesh with a spur-gear 31, also rigid upon the shaft 4, and having a diameter somewhat larger than that of the pinion 29, but smaller than that of the gear 11 for intermediate speed.

The means for reciprocating the driving-element 24 axially preferably consists of the non-rotatable ring 32, having radial arms 33, which are clamped between jam-nuts 34 on sliding rods 35, which in turn are connected at their outer ends by a cross-bar 36, said cross-bar being provided with a hub 37, to which is pivoted at 38 a lever 39, which is fulcrumed at 40 upon the frame 3, as best seen in Figs. 2 and 3. The rods 35 and cross-bar 36 constitute a second yoke, having its hub 37 loosely mounted upon the driven shaft 2 and its rods 35 guided in suitable bearings 41 upon the frame 3 at opposite sides of the shafts 1 and 2.

The reverse driving-clutch element 25 is feathered upon the collar 23 on the driven shaft 2 and is provided with a conical friction-face 42, which is movable into and out of frictional engagement with the conical clutch-section 43, which latter is loosely mounted upon the driven shaft 2 and is provided with a spur-gear 44 in permanent mesh with an idler 44', meshing with a gear 45, rigid on the shaft 4. This driving-clutch member 25 is reciprocated axially by means of a lever 46, which is fulcrumed on the frame 3 and is pivotally connected at its free end to a cross-bar 47, having its opposite ends rigidly secured to a pair of rods 48, which are located equally distant at opposite sides of the shaft 2 and have their inner ends secured to a ring 49 on the driving-clutch element 25, the cross-bar 47 and its rods 48 constituting a third yoke for operating the reverse element 25.

The shifting rings 12, 32, and 49 are each fitted in annular grooves in their respective driving-clutch members 7, 24, and 25, as best seen in Fig. 3, the rings 12 and 32 being held against rotation by engagement with their respective rods 13 and 35, while the ring 49 is also held against rotation by a sliding engagement of the rods 48 in suitable apertures in the adjacent end of the frame 3, as seen in Fig. 3.

Now when it is desired to disconnect the running-gear of the vehicle to which the driven shaft 2 is connected without stopping the engine or driving-shaft 1 the lever 19 is adjusted to throw the driving-clutch element 7 to the position seen in Fig. 3 out of engagement with either of the driven clutch-sections 8' and 9', whereupon the driven shaft 2, auxiliary shaft 4, and all of the gears and their driven clutch-sections are at rest.

When it desired to run the vehicle at high speed, the driving-clutch element 7 is thrown into direct frictional engagement with the clutch member 8', thereby frictionally locking the shaft 2 directly to the driving-shaft 1, while the auxiliary shaft 4 and all members rotating therewith and driven thereby are at rest.

When it is desired to run the vehicle at low speed, the driving-clutch element 7 is shifted axially in the reverse direction into frictional engagement with the clutch member 9', which transmits rotary motion to the auxiliary shaft 4 through the medium of the pinion 10 and gear 11, from which rotary motion is imparted to the clutch members 26', 27', and 43 through the medium of their respective intermeshing gears previously described.

It is now obvious that by shifting the lever 46 to throw the driving-clutch element 24 into engagement with the now rotating clutch member 26' rotary motion will be imparted to the clutch element 24, thence to the shaft 2, through the medium of the collar 22, which is keyed to the shaft 2, and also to the clutch member 24, thereby rotating the shaft 2 at a comparatively low speed by reason of the relative sizes of the gears 28 and 29.

If an intermediate speed is desired, the lever 46 is moved in the opposite direction to throw the clutch member 24 into frictional engagement with the clutch-section 27', which is now driven by the gear 31 and imparts rotary motion to the clutch element 24 and driven shaft 2 at an intermediate speed between the low and high speed, owing to the relative sizes of the gears 30 and 31.

Now if it is desired to reverse the direction of the movement of the vehicle the lever 46 is operated to shift the yoke 47 inwardly, thereby forcing the sliding-clutch element 25 into frictional engagement with its clutch member 43, which latter is now being driven, through the medium of the gear 45 and idler 44' and imparts similar rotary motion to the clutch element 25 and shaft 2, to which such clutch element is keyed through the medium of the collar 23, it being understood, of course, that the clutch element 24 is thrown out of action before the reverse driving element 25 is thrown into engagement with the clutch member 43, and that when transmitting low or intermediate speed to the shaft 2 or reversing the direction of rotation of said shaft the clutch member 7 remains in frictional engagement with the clutch member 9', so as to impart rotary motion to the auxiliary shaft 4, from which the low and intermediate speeds and reverse drive of the shaft 2 is derived.

It will be observed upon reference to Figs. 2 and 4 that the planes in which the rods 13 and 35 are located intersect each other through the axis of the shafts 1 and 2, thereby bringing one rod of each pair in substantially the same vertical plane—that is, one rod, as 13, at one side of the axis of the shafts 1 and 2 is directly over one of the rods 35, while the other rod 13 is directly under the other rod 35—and associated with each pair of rods 13 and 35 at the same side of the axis are vertical rocking levers 50, which are centrally pivoted at 51 to the frame 3, the opposite ends of each lever being bifurcated to partially embrace the adjacent rods 13 and 35, as best seen in Figs. 2 and 4, a slight distance inwardly from the collar 12 or between the driving-clutch elements 7 and 24.

The ends of the lever 50 adjacent to the rods 13 are arranged in the path of movement of the adjacent jam-nuts or abutments 14 when the high speed is thrown into action, but are normally spaced apart from such abutments a distance substantially equal to half of the endwise movement of the rods 13 from their normal to their high-speed positions, and the rods 35 are provided with adjustable shoulders, as nuts 52, which are located substantially the same distance from and at the same sides of the adjacent ends of said levers 50, so that when the rods 13 are moved endwise by the lever 19 to throw the high-speed clutch into action the inner abutments 14 engage the adjacent ends of and rock the levers 50, thereby forcing the opposite ends of said levers, which embrace the rods 35, into close proximity to or against the abutments 52, thereby locking the bars 35 against such endwise movement as would throw the low-speed clutch mechanism into action.

It is consequently obvious that if any attempt should be made to throw the low speed into action while the high-speed clutch is still operating the shoulders 52 would immediately engage and rock the levers 50 to force the high-speed clutch out of action, and vice versa, thus preventing any possibility of bringing the two speed-clutches into action at the same time.

In order to prevent the intermediate or high speed clutch mechanisms from being thrown into action at the same time, I provide rods 13 with additional adjustable abutments 53, which are located between the rings 12 and 32, but in close proximity to the arms 33, which embrace the rods 13, said abutments 53 being spaced apart from the adjacent arms 33 a distance substantially equal to the movement of the rods 13 from their normal to the high speed positions, so that when the high-speed clutch is thrown into action the abutments 53 are in close proximity to or against the adjacent arms 33.

It is now obvious that if any attempt should be made to throw the intermediate-speed clutch mechanism into action while the high-speed clutch is in operation the arms 33, engaging the abutments 53, would shift the rods 13 endwise, and thereby throw the high-speed clutch out of action, while, on the other hand, if the intermediate speed-clutch was in action and the high speed-clutch should be thrown into operative position the abutments 53 would operate against the arms 33 to force the intermediate-speed clutch out of action, thus preventing both of these clutches from being thrown into action at the same time. In order to prevent either the high, low, or intermediate speed clutches from being thrown into action simultaneously with the operation of the reverse drive-clutch, I provide one or both of the rods 35 with adjustable shoulders 54, which are located between and coact with a lever 55, and suitable arms 56 on the ring 49, said arms 56 embracing the rods 35. These abutments 54 are normally spaced apart from the adjacent arm 56 a sufficient distance to allow the rods 35 to be moved endwise to throw the low-speed clutch into action and are spaced apart from the adjacent end of the lever 55 substantially half such distance, while the opposite end of said lever, which is centrally fulcrumed at 57 on the frame 3, is spaced apart an equal distance from the adjacent faces of the ring 49, so that when the reverse drive-clutch section 25 is thrown into action by the rods 48 the ring 49 will encounter the adjacent end of the lever 55, thereby rocking the opposite end of said lever into close proximity to the adjacent abutment 54.

It is now apparent that if the rods 35 are drawn downwardly to throw the low-speed clutch into action the position of the shoulders 54 would be brought close to the arms 56, and if any attempt should be made to throw the reverse drive-clutch element 25 into action the engagement of the arms 56 with the abutments 54 would throw the low-speed clutch out of action, and if the reverse drive-clutch were inadvertently left in action when the low-speed clutch was thrown into operative position the abutments 54 would engage the arms 56 and throw the reverse clutch out of action. On the other hand, when the intermediate-speed clutch is thrown into action the abutments 54 would engage the adjacent end of and rock the lever 55, thereby throwing the opposite end of said lever against the ring 49, which would prevent the inward movement of the reverse drive-clutch member 25, and if the reverse drive-clutch should be thrown into action while the intermediate-speed clutch is in operative position it is apparent that the ring 49, engaging the adjacent end of the lever 55, would cause the opposite end of said lever to engage the adjacent abutments 54, thereby shifting the rods 35 to throw the intermediate-speed clutch out of action. In like manner the rods 13, shifting the high-speed clutch member, may be provided with abutments similar to the abutments 54 to coact with the lever 55 to prevent the high-speed and reverse drive clutches from being thrown into action at the same time.

What I claim is—

1. In a variable-speed power-transmitting device, driving and driven shafts arranged end to end, a direct drive-clutch section rigid on the driven shaft, a second clutch-section loose on the driving-shaft, an axially-movable clutch element between said sections for frictional engagement therewith, an additional clutch having one of its members loose on the driven shaft and its other member rotating with said shaft and movable axially into and out of engagement with said loose member, low-speed gear for transmitting rotary motion from the loose section on the driving-shaft to the loose member on the driven shaft and separately-movable operating devices for the axially-movable clutch elements.

2. In a variable-speed power-transmitting device, driving and driven shafts arranged end to end, a direct drive-clutch section rigid on the driven shaft, a second clutch-section loose on the driving-shaft, an axially-movable clutch element between said sections for frictional engagement therewith, an additional clutch having one of its members loose on the driven shaft and its other member rotating with said shaft and movable axially into and out of engagement with said loose member, low-speed gear for transmitting rotary motion from the loose section of the driving-shaft to the loose member on the driven shaft separately-movable operating devices for the axially-movable clutch elements, and separate means actuated by one of said devices when throwing its clutch element into action for throwing the other clutch element out of action.

3. In a variable-speed power-transmitting device, driving and driven shafts arranged end to end, a sliding clutch element on each shaft, each locked to rotate with its respective shaft, separately-movable devices for moving said elements axially, and means actuated by each of said devices when throwing its clutch into action for simultaneously throwing the other clutch out of action.

4. In a variable-speed power-transmitting mechanism, driving and driven shafts arranged end to end, a pair of clutch members loose on the driven shaft, an axially-movable clutch element rotating with the driven shaft, means for moving said element alternately into engagement with said loose members, a clutch on the driving-shaft, and means including separate pairs of intermeshing gears for transmitting rotary motion from one of the members of the last-named clutch to both of the first-named clutch members.

5. In a variable-speed power-transmitting mechanism, driving and driven shafts arranged end to end, clutch members loose on the driven shaft, an axially-movable clutch element between said members for alternate engagement therewith said clutch element rotating with the driven shaft, an auxiliary shaft geared to both of said clutch members, and means for transmitting rotary motion at a reduced speed from the driving-shaft to the auxiliary shaft, said means including a clutch on the driving-shaft.

6. In a variable-speed power-transmitting device driving and driven shafts arranged end to end, opposite clutch members loose on the driven shaft, an axially-movable clutch element rotating with the driven shaft between said members for engagement therewith, an auxiliary shaft geared to said members, an additional clutch member loose on the driving-shaft and geared to said auxiliary shaft, and a second clutch element locked to the driving-shaft to rotate therewith and means for moving the last-named clutch element into and out of engagement with said additional clutch members, and additional means for moving the first clutch element axially.

7. In a variable-speed power-transmitting mechanism, driving and driven shafts arranged end to end, a clutch member loose on the driving-shaft, an axially-movable clutch element rotating with the driving-shaft, means to move said clutch element into and out of engagement with said clutch member for imparting rotary motion thereto in one direction, a second clutch member loose on the driven shaft, an auxiliary shaft geared to the first-named clutch member and to said second clutch member for rotating the latter member in the reverse direction and a second axially-movable clutch element rotating with the driven shaft and movable into and out of engagement with said second member, whereby the driven shaft is rotated in a direction opposite to that of the driving-shaft.

8. In a variable-speed power-transmitting mechanism, driving and driven shafts arranged end to end, a clutch member loose on the driving-shaft, a second clutch member rigid on the driven shaft, an axially-movable clutch element between said members for alternate engagement therewith, said clutch element rotating with the driving-shaft, means to shift said element axially, a pair of clutch members loose on the driven shaft, a second axially-movable clutch element rotating with the driven shaft between the last-named clutch members for alternate engagement therewith, separate means for moving the second clutch element axially, and an additional clutch member loose on the driven shaft, a third clutch element rotating with the driven shaft, separate means for moving the third clutch element into and out of engagement with the last-named clutch member, and an auxiliary shaft geared to each of said loose clutch members, the last-named clutch member being driven in a reverse direction from the others by means of an idler.

9. In a variable-speed power-transmitting device, driving and driven shafts arranged end to end, opposite clutch members loose on the driven shaft, an axially-movable clutch element rotating with the driven shaft between said members for engagement therewith, an auxiliary shaft geared to said members, an additional clutch member loose on the driving-shaft and geared to said auxiliary shaft, a second clutch element locked to the driving-shaft to rotate therewith, means for moving the last-named clutch element into and out of engagement with said additional clutch member, additional means for moving the first-named clutch element axially, and means actuated by one of the axially-movable clutch members when thrown into action to throw the other axially-movable clutch member out of action.

10. In a variable-speed power-transmitting device, driving and driven shafts arranged end to end and each provided with a loose clutch member, means for transmitting low speed from the loose member on the driving-shaft to that on the driven shaft, an additional clutch member rigid on a driven shaft, a sliding clutch member movable alternately into and out of engagement with the rigid clutch member on the driven shaft and loose clutch member on the driving-shaft, and a second axially-movable clutch member rotating with the driven shaft and movable into and out of engagement with the loose member thereon, and means moving axially with the first-named sliding clutch member when thrown into engagement with the rigid member on the driven shaft to throw the other sliding clutch member on the driven shaft out of engagement with its companion clutch member.

In witness whereof I have hereunto set my hand this 6th day of November, 1905.

FOIST H. EVERHART.

Witnesses:
   H. E. CHASE,
   G. C. LINCOLN.